J. A. CARRON.
SAW FILING MACHINE.
APPLICATION FILED JAN. 13, 1920.
1,435,954.
Patented Nov. 21, 1922.
2 SHEETS—SHEET 1.
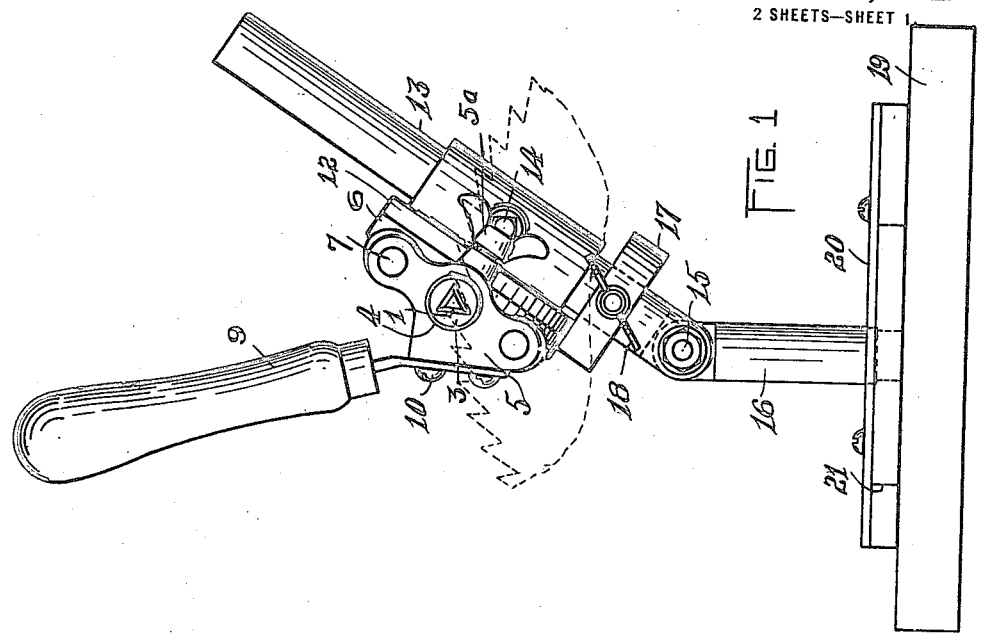
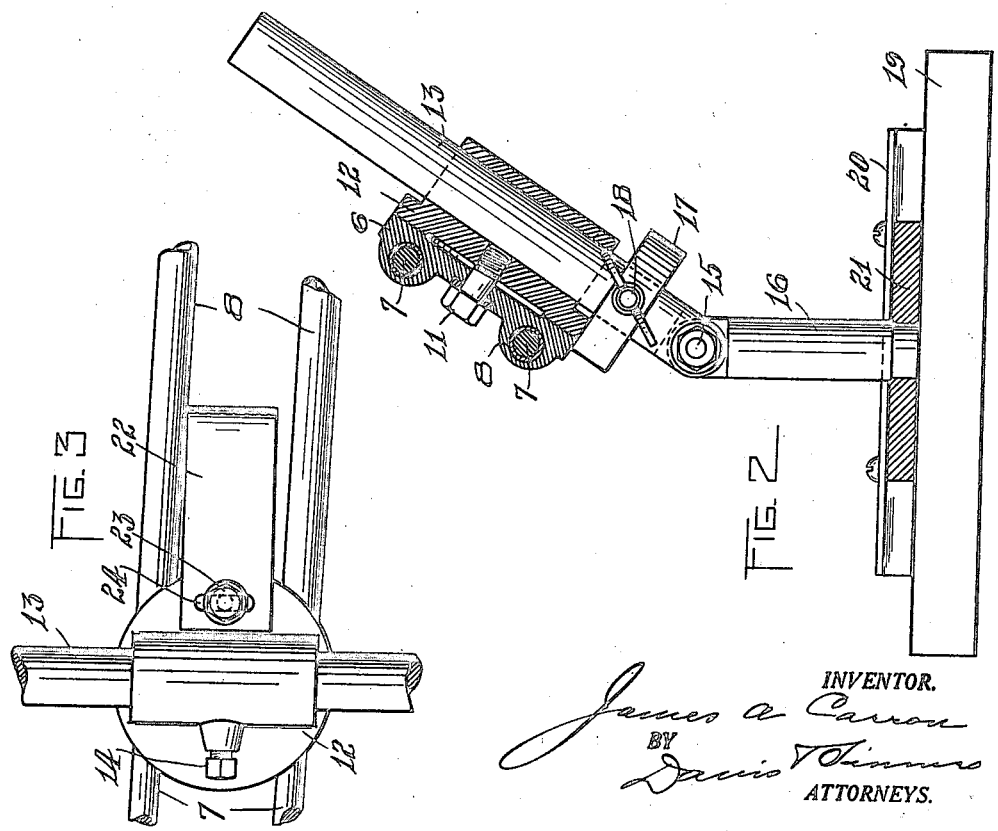
INVENTOR.
James A. Carron
BY
ATTORNEYS.

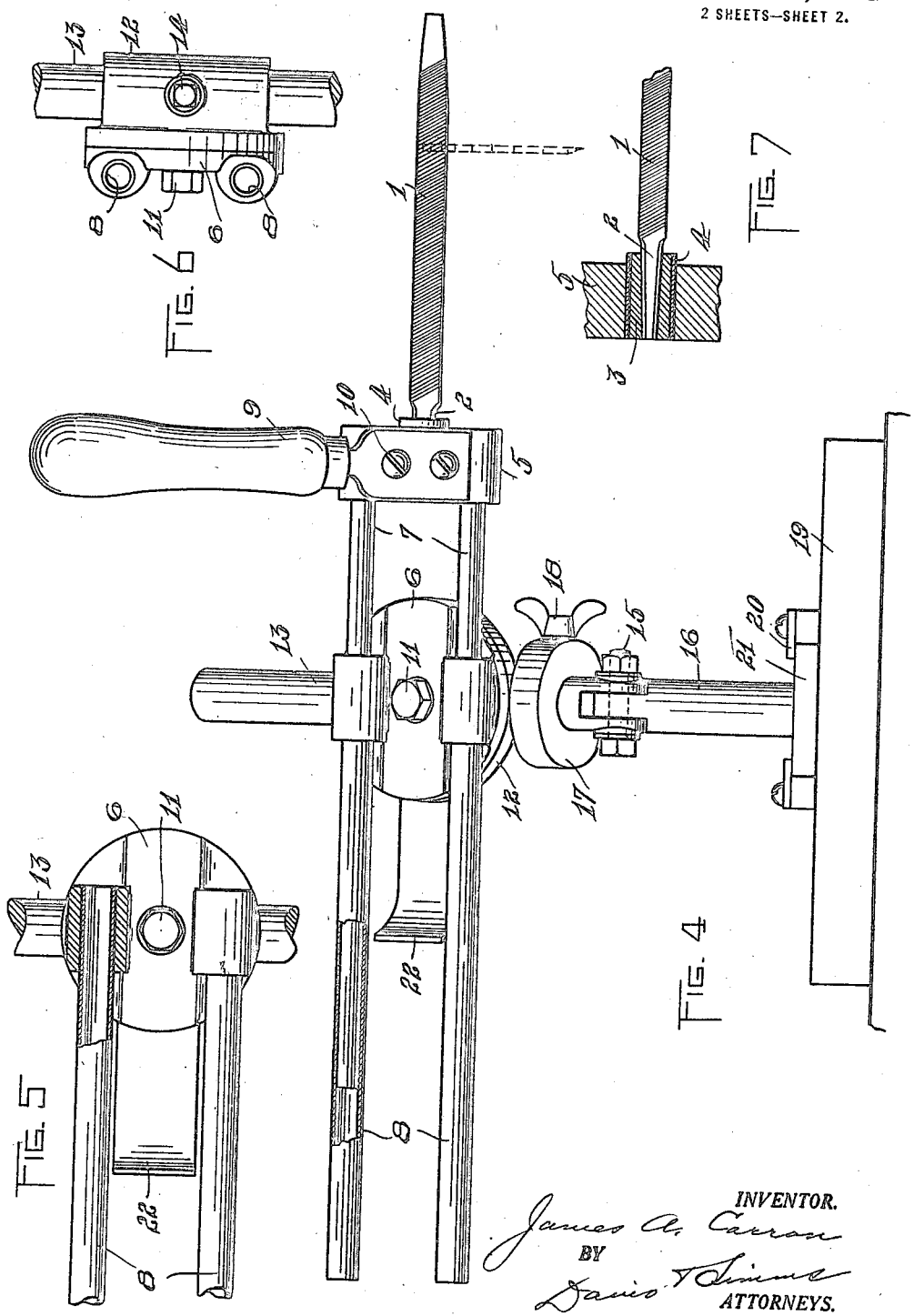

Patented Nov. 21, 1922.

1,435,954

UNITED STATES PATENT OFFICE.

JAMES A. CARRON, OF ROCHESTER, NEW YORK, ASSIGNOR TO ART IN BUTTONS, INC., OF ROCHESTER, NEW YORK, A CORPORATION.

SAW-FILING MACHINE.

Application filed January 13, 1920. Serial No. 351,201.

*To all whom it may concern:*

Be it known that I, JAMES A. CARRON, a citizen of the United States, and resident of Rochester, in the county of Monroe and State of New York, have invented certain new and useful Improvements in Saw-Filing Machines, of which the following is a specification.

The present invention relates to saw filing machines and more particularly to a machine for filing rotary saws, an object thereof being to provide a machine which may be supported adjacent to a rotary saw while the latter is mounted in operative position, provision being made whereby the file may be moved into and out of cooperation with the saw and while in cooperation may be given a movement which will properly reshape the saw teeth.

To these and other ends the invention consists of certain parts and combinations of parts, all of which will be hereinafter described, the novel features being pointed out in the appended claims.

In the drawings:

Fig. 1 is a view in elevation of the filing machine;

Fig. 2 is a view partially in section through the filing machine;

Fig. 3 is a detail view showing a stop controlling the movement of the file toward and from the saw;

Fig. 4 is another view showing the filing machine in elevation and also partially in section, this view being taken substantially at right angles to the view shown in Fig. 1;

Fig. 5 is a detail view partially in section showing the rocking guide;

Fig. 6 is a fragmentary view showing the mounting in which the rocking guide is mounted; and Fig. 7 is a detail view showing the manner in which the file is connected to its holder.

Referring more particularly to the drawings, 1 indicates the file which in this instance is an ordinary three faced file with a pointed end 2. This pointed end is in this instance driven in a block 3 surrounded by a metallic tube 4 which is received within an opening in a file holder 5, said holder having a screw 5$^a$ mounted thereon and adapted to clamp the sleeve 3 against turning in the holder.

The holder 5 is preferably mounted to reciprocate in the direction of the length of the file for the purpose of sharpening the teeth and also to swing transversely of the length of the file for the purpose of bringing the file into and out of cooperation with the saw. These movements, in this instance, are effected by mounting the holder 5 on a rocking guide member 6, the guiding of the holder 5 on the guide member 6 preferably being effected by providing the holder with a pair of parallel rods 7 which are mounted to move in two spaced guide tubes 8 supported on the rocking guide member 6 and projecting from said guide member in a direction opposite from that in which the file projects. Movement of the file holder on the guides may be effected by a handle 9 which is secured by screws 10 to the holder 5.

The rocking guide member 6 is preferably in the form of a disk supported by a pivot bolt 11 on a carrier 12, the pivot of the bolt preferably being supported at an angle to the perpendicular and to the horizontal. The carrier, in this instance, is adjustable on a guide 13 which is arranged at an angle to the perpendicular and the horizontal, the carrier being held in an adjusted position on the guide 13 by a set screw 14. The guide 13 may be adjusted to differet angles to the perpendicular and the horizontal and to this end, it is pivotally supported at its lower end on a bolt 15 carried by a standard 16 and adjustable so that the guide 13 may be clamped in its adjusted position. A collar 17 may be adjustable by a set screw 18 on the guide 13 for the purpose of defining the position of the carrier 12 on said guide so that when the carrier is removed it may be readily fitted in the guide to its original position, the lower part of the carrier cooperating with the upper surface of the collar.

The standard 16 may be adjustably secured on a base 19 and to this end the base is provided with a straight line guide 20 with which a guide foot 21 on the lower end of the standard 16 cooperates. The guide 20 preferably extends in a direction at substantially right angles to the axis of the file so that the file may be moved toward and from the saw which rotates in a plane substantially at right angles to the axis of the file.

Limitation of the rocking guide member about its axis 11 may be effected in any suitable manner for the purpose of defining the movement of the file laterally. In this instance, a stop 22 may be provided in the form of an arm secured to the carrier 12 by a bolt 23, the arm having a slot 24 which permits the stop 22 to be adjusted. This stop projects from the carrier 22 and is deflected between the two guide tubes 8 so that, when the guide tubes are swung with the rocking guide 6 and the file 1, the movement of the file, particularly toward the saw, will be limited.

The operation of the invention will be understood from the foregoing description but it may be stated that the base 1 is secured in a position to one side of the plane of the rotary saw, the file being preferably positioned above the saw and to one side of the axis of the latter. The guide 13 and file securing sleeve 3 are so adjusted that the file enters between the teeth of the saw in a position to engage the opposed faces of the two teeth. The stop 22 is also adjusted so that it limits the amount the file is permitted to cut the teeth. After the file is received between the teeth, it is, through the handle which has also effected the movement of the file to the teeth, reciprocated in order to properly cut the teeth. The carriage 12 is turned on the guide 13 so that the proper bevel on the teeth may be provided and the standard 16 is shiftable on the base 9 so that saws of different diameters may be operated upon.

A filing machine constructed in accordance with this invention may be supported to one side of a rotary saw while the latter is upon its operating shaft so that it is unnecessary to remove the saw from the machine. The file may be given a movement to file the teeth at the proper angle and may be readily operated by unskilled operatives, the movements of the file being so controlled that only the desired amount is removed from the teeth. The file holder is mounted to reciprocate and also to turn about an axis at an angle to the perpendicular and the horizontal, such movement being very desirable for operating upon rotary saws. The angle at which the file holder turns may be changed to correspond with teeth of different forms and the position of the supporting means for the file holder may be shifted so that saws of different diameters and constructions may be operated upon.

What I claim as my invention and desire to secure by Letters Patent is:

1. In a saw filing machine, a file holder, means for supporting said file holder for a reciprocatory movement and a free movement about an axis at an angle to the perpendicular and the horizontal situated entirely to one side of the plane of the saw being operated on and a handle connected to the file holder between the file and said axis.

2. A saw filing machine comprising a file holder, a rocking file on which the file is mounted to reciprocate, said guide holder being adapted to move freely about an axis at an angle to the perpendicular and the horizontal situated entirely to one side of the plane of the saw being operated on and a handle connected to the file holder between the file and said axis.

3. A saw filing machine comprising a file holder, a rocking guide on which the file holder is mounted to reciprocate, a carrier on which said guide is mounted to turn about an axis at an angle to the perpendicular and the horizontal, and a guide on which said carrier is movable, arranged at an angle to the perpendicular and the horizontal.

4. A saw filing machine comprising a file holder, a guide member on which the file holder is adapted to reciprocate, a carrier on which the guide member is adapted to rock about an axis at an angle to the perpendicular and the horizontal, and a guide on which the carrier is adjustable, said guide being arranged at an angle to the perpendicular and the horizontal and being adjustable to change such angle.

5. A filing machine comprising a file holder, a rocking guide on which the file holder is mounted to reciprocate, said rocking guide being arranged to move freely about an axis at an angle to the perpendicular and the horizontal situated entirely to one side of the plane of the saw being operated on, a handle connected to the file holder at a point between the file and said axis, and means permitting the angle of said axis to be changed.

6. A saw filing machine comprising a pair of guides, a rocking guide member, and a pair of tubes carried by said guide member and receiving the guides and a file holder arranged at one end of the guides so as to cause the file to project beyond the guides.

7. A saw filing machine comprising a file holder, a rocking guide on which the file holder is mounted to reciprocate, said guide being mounted to rock about an axis situated entirely to one side of the plane of the saw being operated on and at an angle to the perpendicular and the horizontal, a handle connected to the file holder between the file and said axis, and means for limiting the movement of the rocking guide member.

8. A saw filing machine comprising a file holder having a pair of guides, a rocking guide member having a pair of guide tubes in which the guides on the file holder are mounted to reciprocate, said guide being mounted to rock about an axis situated entirely to one side of the plane of the saw being operated on and at an angle to the perpendicular and the horizontal, a handle connected to the file holder between the file and said axis, and a limiting stop arranged to cooperate with said guide tubes to limit the swinging movement of the rocking guide.

9. A saw filing machine comprising a file holder, a rocking guide on which said file holder is mounted to reciprocate, and a horizontally adjustable standard on which said rocking guide member is supported.

10. A saw filing machine comprising a file holder, a rocking guide on which the file holder is mounted to reciprocate, and a standard adjustable horizontally and having the rocking guide carried thereby to turn about an axis at an angle to the perpendicular and the horizontal.

11. A saw filing machine comprising a file holder, a rocking guide on which said file holder is mounted to reciprocate, a carrier on which said rocking guide turns, a standard having a guide thereon arranged at an angle to the perpendicular and the horizontal and on which the carrier is adjustable, and means for adjustably supporting the standard to permit the latter to move horizontally transversely of the line of movement of the file holder.

12. In a saw filing machine, a file holder, means for supporting and guiding the file holder, said means being situated vertically entirely to one side of the field of movement of the file in the holder and a handle connected to said file holder at a point between the file and the means for guiding the file holder.

13. In a saw filing machine, a file holder having means for securing a file at one end to permit the latter to project therefrom in one direction, said file holder having guiding means thereon extending in the direction away from the point where the file is held by the file holder, means on which said guiding means is mounted to reciprocate and a handle connected to said file holder at a point between the file and the means on which said guiding means is mounted to reciprocate.

14. In a saw filing machine, a file holder having means for securing a file at one end to permit the latter to project therefrom in one direction, said file holder having guiding means thereon extending in the direction away from the point where the file is held by the file holder, and a rocking guide on which said guiding means is mounted to reciprocate, said rocking guide being mounted to turn about an axis at an angle to the perpendicular and the horizontal and at one side of the field of movement of the file in the file holder.

15. A saw filing machine comprising a file holder having means for securing a file at one end to permit the latter to project therefrom in one direction, said file holder having guiding means in the form of two spaced guides extending in the direction opposite that from which the file projects from the file holder, and a guide member on which said guides are mounted to reciprocate.

JAMES A. CARRON.

Certificate of Correction.

It is hereby certified that in Letters Patent No. 1,435,954, granted November 21, 1922, upon the application of James A. Carron, of Rochester, New York, for an improvement in "Saw-Filing Machines," errors appear in the printed specification requiring correction as follows: Page 2, line 67, claim 2, for the word "file", first occurrence, read *guide*, and line 68, for the word "guide" read *file;* and that the said Letters Patent should be read with these corrections therein that the same may conform to the record of the case in the Patent Office.

Signed and sealed this 26th day of December, A. D., 1922.

[SEAL.]                KARL FENNING,

*Acting Commissioner of Patents.*